(12) United States Patent
Nascimento et al.

(10) Patent No.: US 11,827,144 B2
(45) Date of Patent: Nov. 28, 2023

(54) ILLUMINATED STITCHING THAT PROVIDES VEHICLE STATUS

(71) Applicant: Inteva Products, LLC, Troy, MI (US)

(72) Inventors: Aidano Nascimento, Oakland, MI (US); Tyler Bame, Clawson, MI (US); Pamela Sue Greenwald, Sterling Heights, MI (US)

(73) Assignee: INTEVA PRODUCTS, LLC, Troy, MI (US)

(*) Notice: Subject to any disclaimer, the term of this patent is extended or adjusted under 35 U.S.C. 154(b) by 0 days.

(21) Appl. No.: 17/529,655

(22) Filed: Nov. 18, 2021

(65) Prior Publication Data

US 2022/0153189 A1 May 19, 2022

Related U.S. Application Data

(60) Provisional application No. 63/115,362, filed on Nov. 18, 2020.

(51) Int. Cl.
| | | |
|---|---|---|
| *B60Q 3/54* | (2017.01) | |
| *B60R 13/02* | (2006.01) | |
| *B60Q 3/78* | (2017.01) | |
| *B62D 65/14* | (2006.01) | |
| *F21S 41/141* | (2018.01) | |

(52) U.S. Cl.
CPC ............. *B60Q 3/54* (2017.02); *B60Q 3/78* (2017.02); *B60R 13/02* (2013.01); *B62D 65/14* (2013.01); *F21S 41/141* (2018.01)

(58) Field of Classification Search
CPC ... B60Q 3/54; B60Q 3/78; B60Q 3/02; B60Q 3/04; B60Q 3/74; B60R 13/02; B62D 65/14; F21S 41/141; F21V 8/00

USPC ................................ 362/477, 511; 296/1.08
See application file for complete search history.

(56) References Cited

U.S. PATENT DOCUMENTS

| | | |
|---|---|---|
| 4,210,255 A | 7/1980 | Pan |
| 4,234,907 A | 11/1980 | Daniel |
| 6,146,006 A | 11/2000 | Cross |
| 6,450,678 B1 | 9/2002 | Bayersdorfer |
| 6,851,844 B2 | 2/2005 | Guy |
| 7,234,853 B2 | 6/2007 | Givoletti |
| 7,364,315 B2 | 4/2008 | Chien |
| 8,215,810 B2 | 7/2012 | Welch, Sr. et al. |
| 8,256,945 B2 | 9/2012 | Choquet |

(Continued)

FOREIGN PATENT DOCUMENTS

| | | |
|---|---|---|
| CN | 102066156 A | 5/2011 |
| CN | 201890187 U | 7/2011 |

(Continued)

OTHER PUBLICATIONS

US 10,822,731 B2, 11/2020, Kansteiner et al. (withdrawn)

(Continued)

*Primary Examiner* — Laura K Tso
(74) *Attorney, Agent, or Firm* — CANTOR COLBURN LLP

(57) ABSTRACT

An illuminated stitching assembly for a vehicle interior, including: a diffuser; a light source; an outer layer secured to the diffuser; and stitches located on the outer layer, the stitches being illuminated by the light source, the light source being operably coupled to a controller, the controller being configured to operate the light source, wherein the diffuser is configured to be inserted into a cavity of a substrate layer.

12 Claims, 11 Drawing Sheets

FIG. 2

(56) References Cited

U.S. PATENT DOCUMENTS

| | | |
|---|---|---|
| 8,317,247 B2 | 11/2012 | Beau et al. |
| 9,067,530 B2 | 6/2015 | Bayersdorfer et al. |
| 9,335,457 B2 | 5/2016 | Zimmermann et al. |
| 9,440,582 B2 | 9/2016 | Bayersdorfer et al. |
| 9,817,169 B2 | 11/2017 | Wenzel et al. |
| 9,821,196 B2 | 11/2017 | Lin |
| 9,905,197 B2 | 2/2018 | Yamada |
| 10,053,026 B2 | 8/2018 | Sato |
| 10,562,446 B2 | 2/2020 | Cannon |
| 10,618,465 B2 | 4/2020 | Laluet et al. |
| 11,124,112 B2 | 9/2021 | Wimmer et al. |
| 2009/0316401 A1 | 12/2009 | Choquet |
| 2013/0077338 A1 | 3/2013 | Wenzel et al. |
| 2015/0085519 A1 | 3/2015 | Ammar et al. |
| 2015/0283941 A1 | 10/2015 | Wenzel et al. |
| 2018/0044831 A1 | 2/2018 | Kansteiner et al. |
| 2020/0123684 A1 | 4/2020 | Nishimura |
| 2020/0324693 A1 | 10/2020 | Begalli et al. |
| 2022/0104328 A1 | 3/2022 | Kim |

FOREIGN PATENT DOCUMENTS

| | | |
|---|---|---|
| CN | 112356770 A | 2/2021 |
| DE | 19724486 A1 | 12/1998 |
| DE | 102012215164 A1 | 3/2014 |
| DE | 102012216334 A1 | 3/2014 |
| DE | 202014000342 U1 | 4/2014 |
| DE | 102013202222 A1 | 8/2014 |
| DE | 102014201730 A1 | 10/2014 |
| DE | 102013015907 A1 | 3/2015 |
| DE | 202015103947 U1 | 8/2015 |
| DE | 102015113654 A1 | 3/2016 |
| DE | 102014116758 A1 | 5/2016 |
| DE | 102015103850 A1 | 9/2016 |
| DE | 202017107616 U1 | 1/2018 |
| DE | 102016114962 A1 | 2/2018 |
| DE | 202020104604 U1 | 3/2021 |
| EP | 3650752 A1 | 5/2020 |
| FR | 2844868 A1 | 3/2004 |
| FR | 2890152 A1 | 3/2007 |
| FR | 2927859 A1 | 8/2009 |
| FR | 2979412 A1 | 3/2013 |
| GB | 2566258 A | 3/2019 |
| JP | 2009279999 A | 12/2009 |
| JP | 3178627 U | 8/2012 |
| JP | 2012228921 A | 11/2012 |
| JP | 2015074328 A | 4/2015 |
| JP | 2017065355 A | 4/2017 |
| KR | 200459132 Y1 | 3/2012 |
| KR | 101776487 B1 | 9/2017 |
| KR | 101956390 B1 | 3/2019 |
| KR | 102057222 B1 | 12/2019 |
| WO | 2006117127 A1 | 11/2006 |
| WO | 2013060834 A1 | 5/2013 |
| WO | 2014036629 A1 | 3/2014 |
| WO | 2018225146 A1 | 12/2018 |
| WO | 2019231723 A1 | 12/2019 |

OTHER PUBLICATIONS

International Search Report for International Application No. PCT/US2021/059861; Date of Completion: Mar. 21, 2022; dated Mar. 21, 2022; 3 Pages.

Written Opinion for International Application No. PCT/US2021/059861; Date of Completion: Mar. 21, 2022; dated Mar. 21, 2022; 5 Pages.

CN Office Action for Application No. 201710676053.9; dated May 8, 2021.

English Translation German Office Action for Application No. 10 2016 114 843.1; dated Jun. 8, 2017.

German Office Action for Application No. 10 2016 114 843.1; dated Jun. 8, 2017.

Search Report for Application No. GB1712809.1 (3 pages).

International Preliminary Report on Patentability for International Application No. PCT/US2021/059861; dated Jun. 1, 2023; 7 pages.

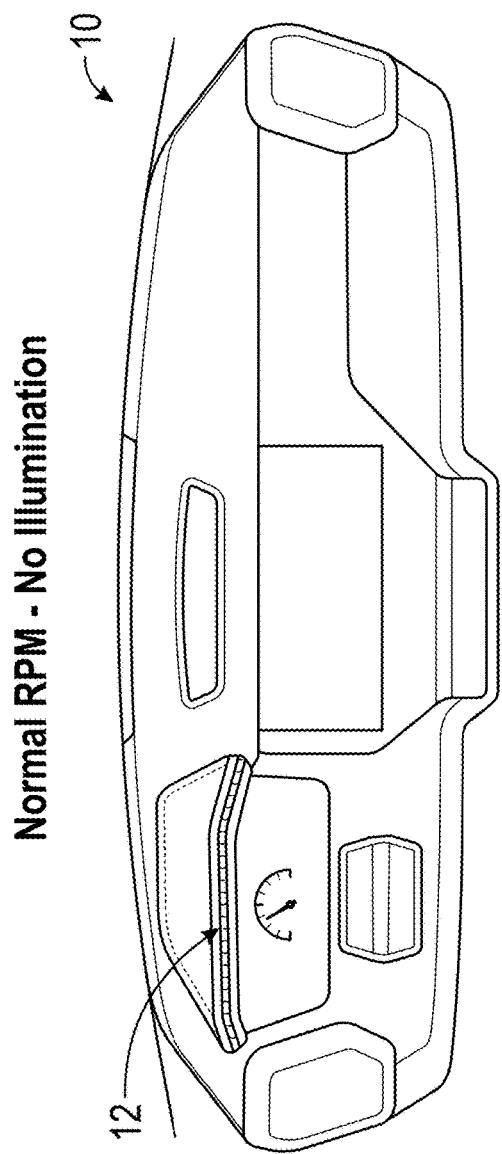
FIG. 4A — Normal RPM - No Illumination
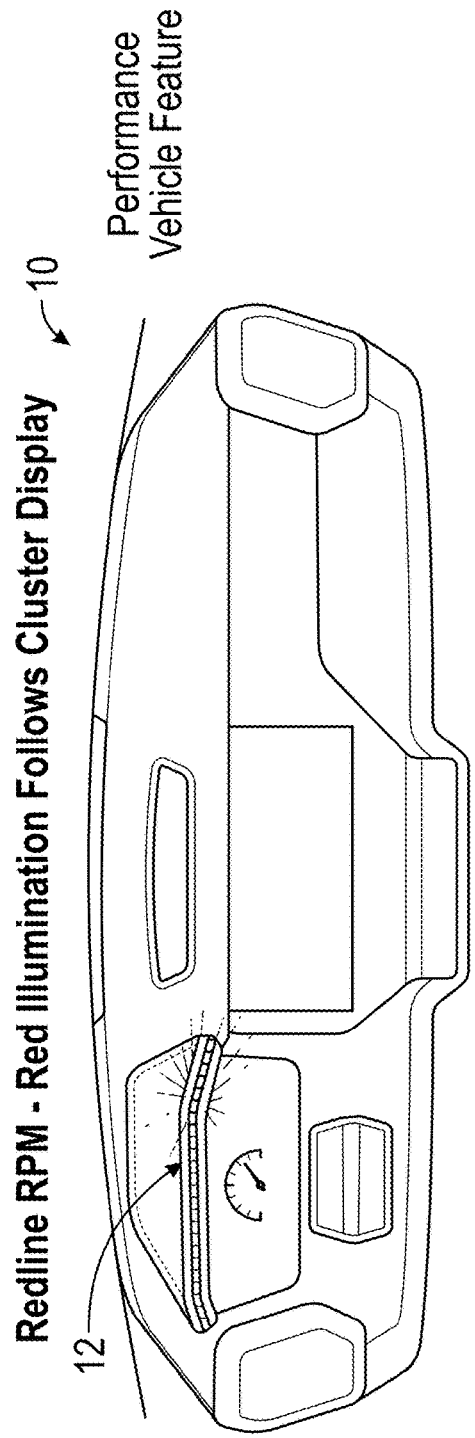
FIG. 4B — Redline RPM - Red Illumination Follows Cluster Display
Performance Vehicle Feature Top Section (Braking)

Bottom Section (Acceleration)

Right Section (G-Force Right)

Left Section (G-Force Left)

ILLUMINATED STITCHING THAT PROVIDES VEHICLE STATUS

CROSS REFERENCE TO RELATED APPLICATIONS

This application claims the benefit of U.S. Provisional Application Ser. No. 63/115,362 filed on Nov. 18, 2020, the contents of which are incorporated herein by reference thereto.

BACKGROUND

Exemplary embodiments of the present disclosure pertain to the art of vehicle interiors.

Decorative and functional stitching may be used on vehicle interior panels, sometimes due to the part design and mostly to provide premium aesthetics and enhance quality and craftsmanship. Stitching can be located throughout the entire vehicle interior, seats, instrument panel, doors and console. For the most part, the stitches are static and executed with standard sewing thread, either Nylon or Polyester. As interiors become smarter and incorporate more electronics, there can be a way to allow the interior trim stitching to communicate alerts or other information to the user.

Accordingly, it is desirable to provide a vehicle with improved lighting features or components.

BRIEF DESCRIPTION

Disclosed is illuminated stitching for a vehicle interior, wherein the illuminated stitching provides a visual indication of an orientation of the vehicle.

Disclosed is an illuminated stitching assembly for a vehicle interior, including stitches located on an outer layer, the stitches being illuminated by a light source, the light source being operably coupled to a controller, the controller being operably coupled to at least one sensor in order to provide a visual indication with the light source of an orientation of a vehicle the vehicle interior is located in.

In addition to one or more of the features described above, or as an alternative to any of the foregoing embodiments, the light source is a plurality of light emitting diodes.

In addition to one or more of the features described above, or as an alternative to any of the foregoing embodiments, the orientation of the vehicle a cross-vehicle orientation.

In addition to one or more of the features described above, or as an alternative to any of the foregoing embodiments, the orientation of the vehicle is a front to rear orientation.

In addition to one or more of the features described above, or as an alternative to any of the foregoing embodiments, a welt is located in a gap of a seam of the outer layer, wherein the welt is illuminated by the light source.

In addition to one or more of the features described above, or as an alternative to any of the foregoing embodiments, the visual indication is provided by static and/or dynamic light that is provide by the light source.

Also disclosed is an illuminated stitching assembly for a vehicle interior, including a diffuser; a light source; an outer layer secured to the diffuser; and stitches located on the outer layer, the stitches being illuminated by the light source, the light source being operably coupled to a controller, the controller being configured to operate the light source, wherein the diffuser is configured to be inserted into a cavity of a substrate layer.

In addition to one or more of the features described above, or as an alternative to any of the foregoing embodiments, at least one fastener is provided for securing the diffuser to the cavity of the substrate layer.

In addition to one or more of the features described above, or as an alternative to any of the foregoing embodiments, the light source is a plurality of light emitting diodes.

In addition to one or more of the features described above, or as an alternative to any of the foregoing embodiments, the substrate layer is a portion of an instrument panel.

In addition to one or more of the features described above, or as an alternative to any of the foregoing embodiments, the light source is a plurality of light emitting diodes.

In addition to one or more of the features described above, or as an alternative to any of the foregoing embodiments, the substrate layer is a portion of an instrument panel.

In addition to one or more of the features described above, or as an alternative to any of the foregoing embodiments, a welt is located in a gap of a seam of the outer layer, wherein the welt is illuminated by the light source.

In addition to one or more of the features described above, or as an alternative to any of the foregoing embodiments, the light source is a plurality of light emitting diodes.

Also disclosed is an illuminated stitching assembly for a vehicle interior, comprising stitches located on an outer layer, a welt located in a gap of a seam of the outer layer, the stitches and/or the welt being capable of being illuminated by a light source, the light source being operably coupled to a controller, the controller being operably coupled to at least one sensor.

In addition to one or more of the features described above, or as an alternative to any of the foregoing embodiments, the illuminated stitching assembly provides a visual indication that is indicative of a state of that is indicative of a state of a vehicle the vehicle interior is located in or a subsystem or feature of the vehicle.

In addition to one or more of the features described above, or as an alternative to any of the foregoing embodiments, the welt and the stitches are independently illuminated.

In addition to one or more of the features described above, or as an alternative to any of the foregoing embodiments, only the welt is illuminated.

In addition to one or more of the features described above, or as an alternative to any of the foregoing embodiments, the stitches and the welt are located around a bezel surrounding a portion of a vent of an instrument panel.

BRIEF DESCRIPTION OF THE DRAWINGS

The following descriptions should not be considered limiting in any way. With reference to the accompanying drawings, like elements are numbered alike:

FIGS. 4A-4F are illustrations of a vehicle interior illustrating various functions of the illuminated stitching in accordance with the present disclosure;

DETAILED DESCRIPTION

Figure 1:
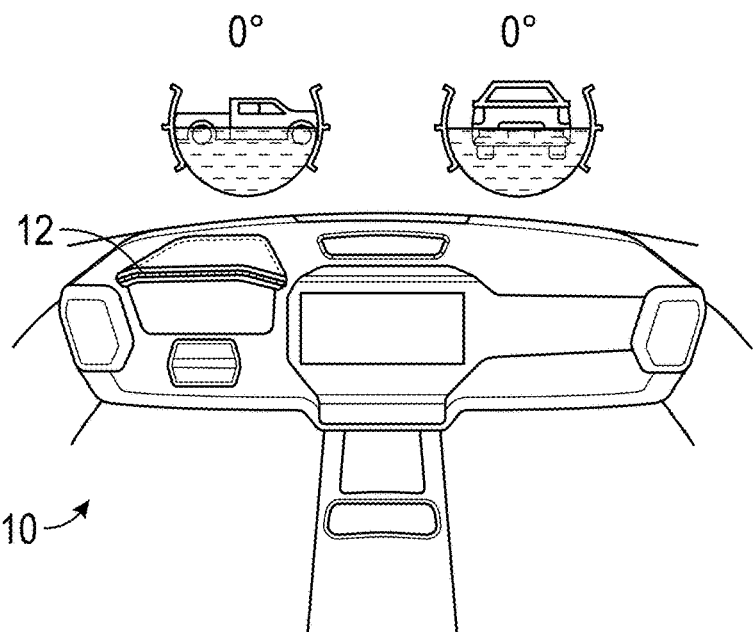
FIG. 1 is a schematic illustration of a vehicle interior in a first orientation with illuminated stitching in accordance with the present disclosure.

A detailed description of one or more embodiments of the disclosed apparatus and method are presented herein by way of exemplification and not limitation with reference to the Figures.

Reference is made to the following patents U.S. Pat. Nos. 9,703,029; and 9,817,169, the contents each of which are incorporated herein by reference thereto. Reference is also made to the following U.S. Patent Publication No. US 2018/0044831 the contents of which are incorporated herein by reference thereto.

The present disclosure is directed to a stitching apparatus or assembly and method that can be used to communicate vehicle performance status to occupants of the vehicle. The stitching is made of an illuminated material and/or can be packaged with light guides underneath. The illuminated stitching can be used to demonstrate vehicle information to the occupants. For example and in one non-limiting embodiment, the illuminated stitching can be used to indicate inclination of the vehicle during off-road/rock climbing situations with visual cues to the occupants.

In one embodiment of this design, the light source associated with the illuminated stitching can communicate other alerts, such as when the vehicle RPMs hit a redline or if there is a blind spot/obstacle detected by exterior sensors. In one non-limiting embodiment, the light source may be a plurality of light emitting diodes (LEDs). Alternatively, the light source may be any type of light source suitable for the desired application non-limiting examples include but are not limited to; light emitting diodes (LEDs), organic light-emitting diodes (OLEDs or organic LEDs), organic electroluminescent (organic EL) diodes, quantum dot light-emitting diodes (QLEDs), side emitting fiber optic cables or any other equivalent device.

The disclosure can be scalable, where for the base entry level vehicle it can consist basically of a static stitch. For the mid-level, the stitching can indicate commonly used alerts, such as blind spot, speed limit, next turn on navigation, proximity, rear occupant reminder, etc. For the up-level, the stitching can be used as ambient lighting and/or for the performance level (rock climbing, racing, off roading, etc. . . .) the stitching can provide vehicle performance visual feedback.

For example, the light source or light emitting diodes (LEDs), etc. associated with the illuminated stitching can communicate a proximity alert (e.g., closeness to a vehicle in front during adaptive cruise control or obstacles behind vehicle when in reverse). Other alerts may include a rear seat occupant reminder. For example, the stitching can illuminate to replace a light indicator that accounts for occupants that are present or absent in the rear seats. The light source or light emitting diodes (LEDs) associated with the illuminated stitching can also be configured to provide a visual indication of a vehicle lane departure. In other words, if vehicle drifts into the wrong lane, the illuminated stitching can provide supplemental visual feedback. As such, the illuminated stitching can provide a visual indication that is indicative of a state of the vehicle or a subsystem or feature of the vehicle. In any of the above concepts, the light source or light emitting diodes (LEDs) are operably coupled to a microprocessor or other equivalent device which is also operably coupled to a sensor or sensors of the aforementioned alerts or vehicle features such that the illuminated stitching can be operated to provide a visual indicator of a status of a system of the vehicle or a status of the vehicle itself In one embodiment, the audio output and the illuminated stitching can be synced providing enhanced occupant experience.

In one embodiment, the interior of the vehicle and its illuminated stitching can be configured to provide separate but similar systems for both the driver side and the passenger side of the vehicle. Some examples of such systems would be blind spot or turn signal indicators provided by the illuminated stitching. This is a more cost effective method where fewer light sources or LEDs and electronics are required versus a continuous illuminated stitch that runs across the full cross-car length of the instrument panel. Components that are the same on both driver side and passenger side could also have duplicate part numbers for further cost reduction.

Some proposed areas on instrument panel that would be suitable for illuminated stitching include around a center display. Most vehicle center displays have a thin bezel around the perimeter, this could be made a soft-wrapped component with illuminated stitching, allowing the light source or LEDs packaged behind the stitching to synchronize with the graphics on the display to highlight various controls or information.

The illuminated stitching could also be located around a driver cluster display. Similar to the center display concept, the illuminated stitching can be applied to the bezel trim of the driver display. This could be a location for the illuminated stitching to indicate vehicle redline or autonomous driving mode status.

Other locations may include an internal surface area such as a cluster hood with an illuminated logo that also include the following alerts: such as the aforementioned lane assist, blind spots, adaptive cruise control, also a welcome message could be included such a greeting light sequence when a user enters vehicle or starts engine, also a vehicle lock/unlock visual alert that synchronizes with the external blinkers when the user presses lock/unlock on the key fob.

FIG. 1 is a schematic illustration of a vehicle interior 10 in a first orientation with an illuminated stitching assembly 12 in accordance with the present disclosure. In this embodiment, the illuminated stitching assembly 12 provides an indication of an orientation of the vehicle (e.g., whether it is level from a cross-vehicle orientation (e.g., from driver's side to passenger side) and/or whether it is level in a front to rear orientation).

Figure 2:
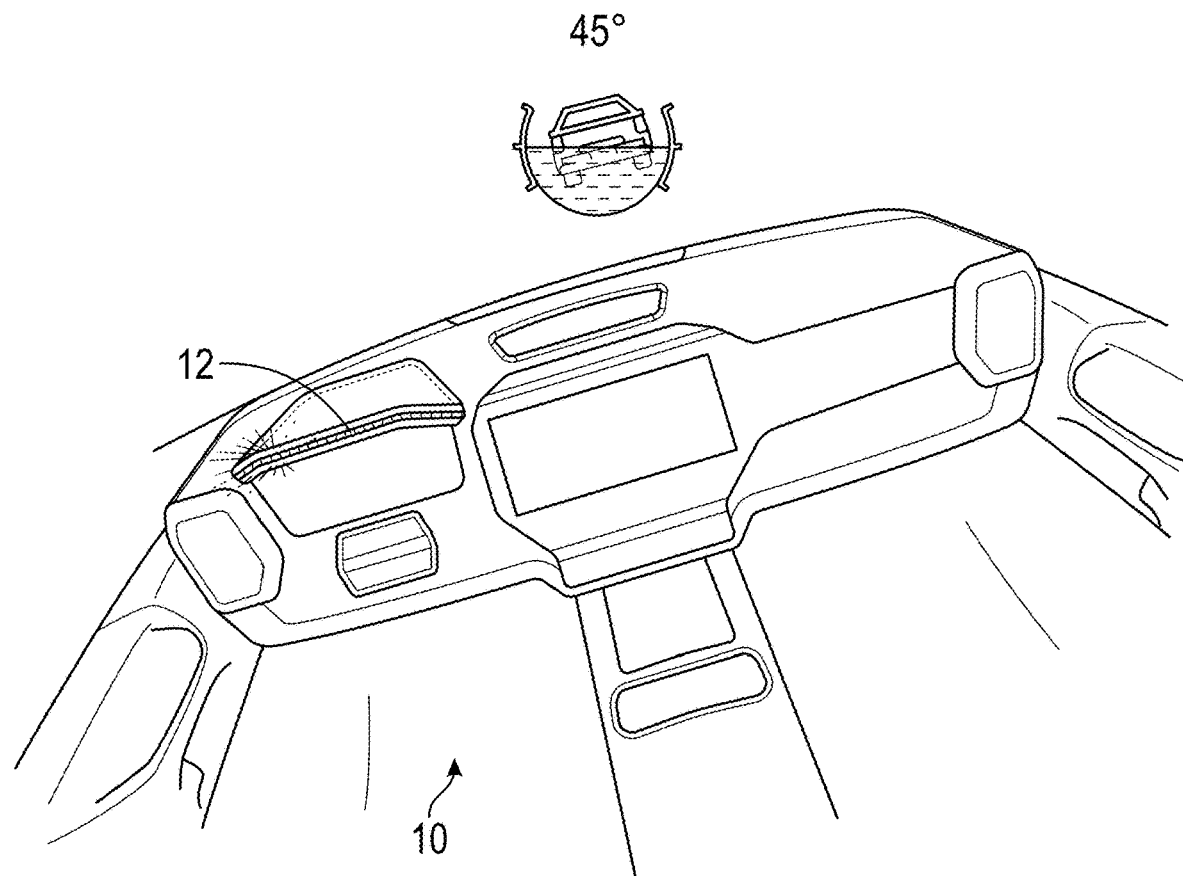
FIG. 2 is a schematic illustration of a vehicle interior in a second orientation with illuminated stitching in accordance with the present disclosure.

FIG. 2 is a schematic illustration of the vehicle interior 10 in a second orientation wherein the vehicle is tilted in a cross-vehicle orientation (e.g., from driver's side to passenger side) wherein the illuminated stitching assembly 12 provides a corresponding illumination, which in one embodiment may be a color and/or or a left indication corresponding to the view illustrated in FIG. 2.

Figure 3:
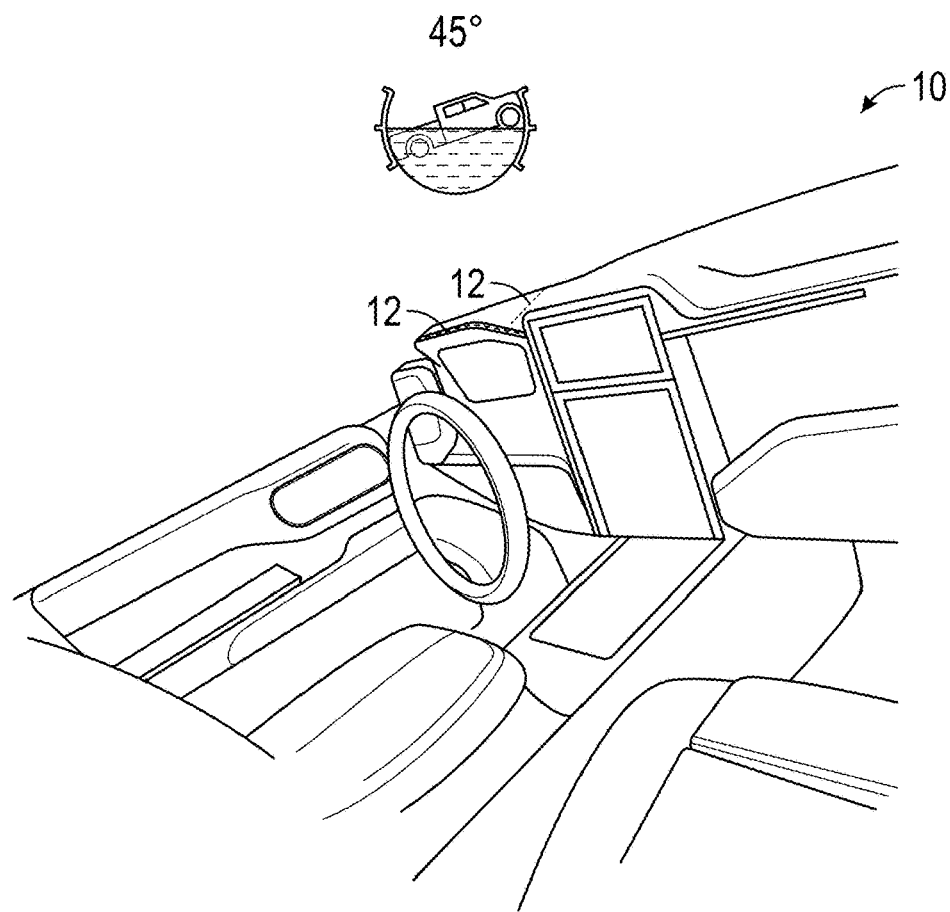
FIG. 3 is a schematic illustration of a vehicle interior in a third orientation with illuminated stitching in accordance with the present disclosure.

FIG. 3 is a schematic illustration of the vehicle interior 10 in a third orientation wherein the vehicle is tilted in a front to rear orientation wherein the illuminated stitching assembly 12 provides a corresponding illumination, which in one embodiment may be a color and/or or a rear indication (e.g., upper portion of the vehicle is elevated with respect to the rear) corresponding to the view illustrated in FIG. 3. While a suitable location for the illuminated stitching assembly 12 is illustrated in the FIGS. 1-3 it is, of course, understood that other locations other than those illustrated in the attached FIGS. are considered to be within the scope of the present application.

Figure 4:
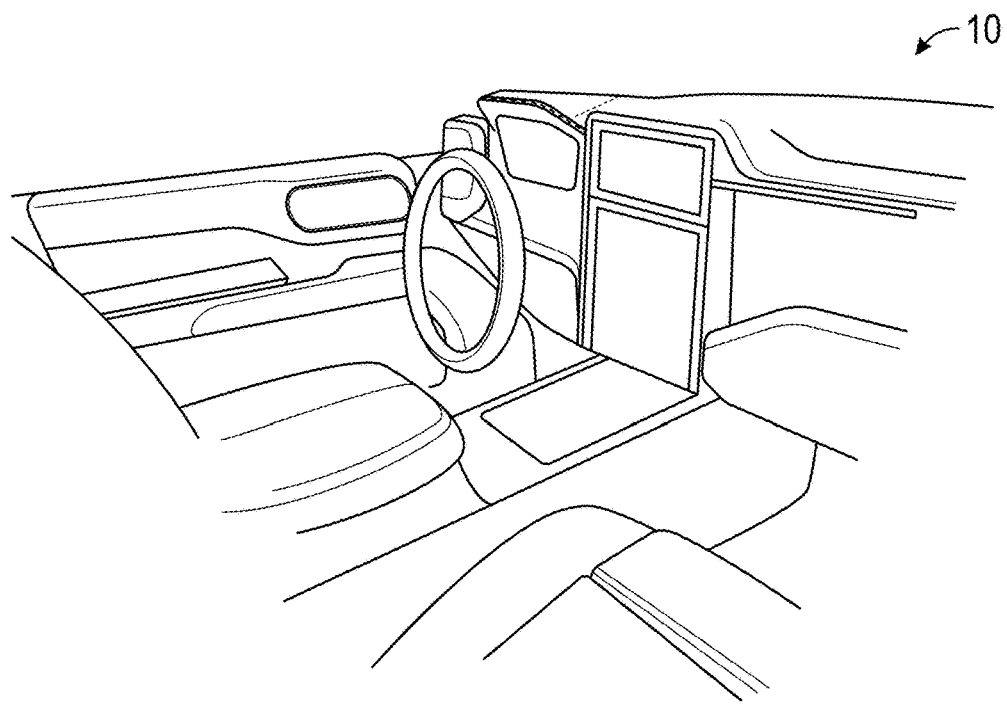
FIG. 4 is a schematic illustration of a vehicle interior for use with illuminated stitching in accordance with the present disclosure.
Figure 4C:
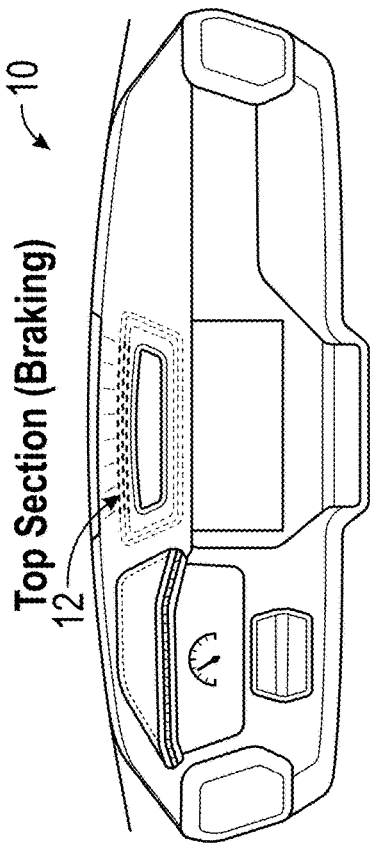
Figure 4D:
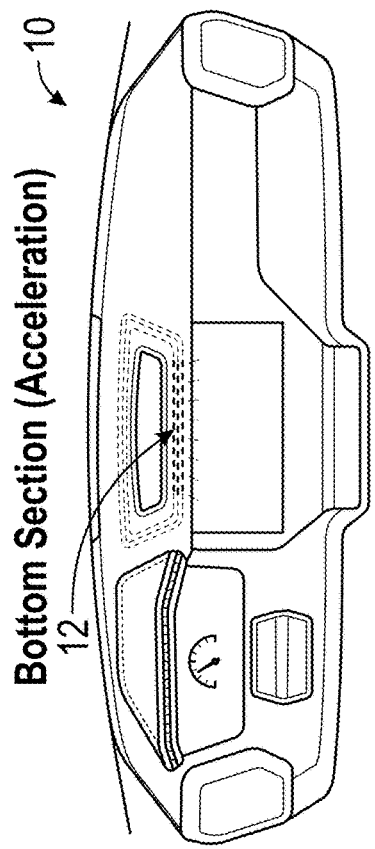
Figure 4E:
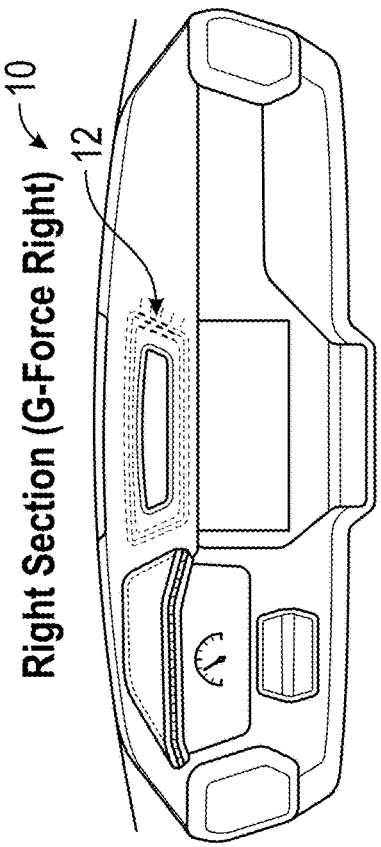
Figure 4F:
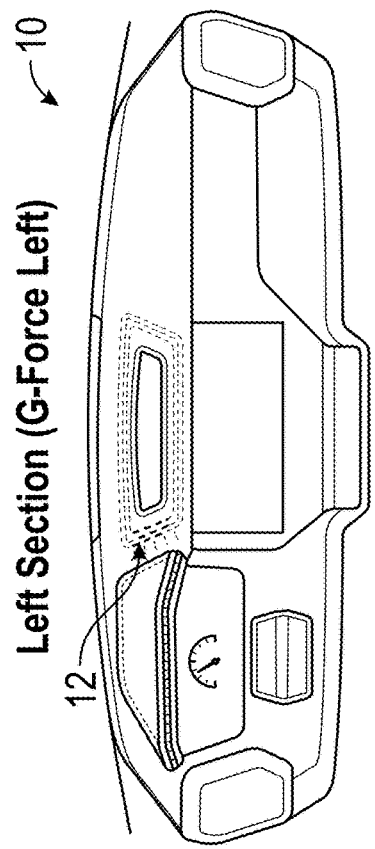

FIG. 4 is a schematic illustration of a vehicle interior 10 for use with the illuminated stitching assembly 12 in accordance with the present disclosure.

FIGS. 4A-4F are illustrations of a vehicle interior illustrating various functions of the illuminated stitching in accordance with the present disclosure. In FIGS. 4A and 4B the illuminated stitching assembly 12 is used to show vehicle RPMs. In FIG. 4A there is no illumination and in FIG. 4B illumination is shown. For example, a red illumination can be shown with the illuminated stitching assembly 12. In FIGS. 4C-4F the illuminated stitching assembly 12 is located in a central portion of the vehicle interior and can be used to illustrate braking (illumination of the upper or top section of the illuminated stitching assembly 12 illustrated in FIG. 4C); acceleration (illumination of the lower or bottom section of the illuminated stitching assembly 12 illustrated in FIG. 4D); right side G-forces (illumination of the right side section of the illuminated stitching assembly 12 illustrated in FIG. 4E); and left side G-forces (illumination of the left side section of the illuminated stitching assembly 12 illustrated in FIG. 4F). For ease of review, the steering wheel is not illustrated in FIGS. 1, 2 and 4A-4F.

Figure 5:
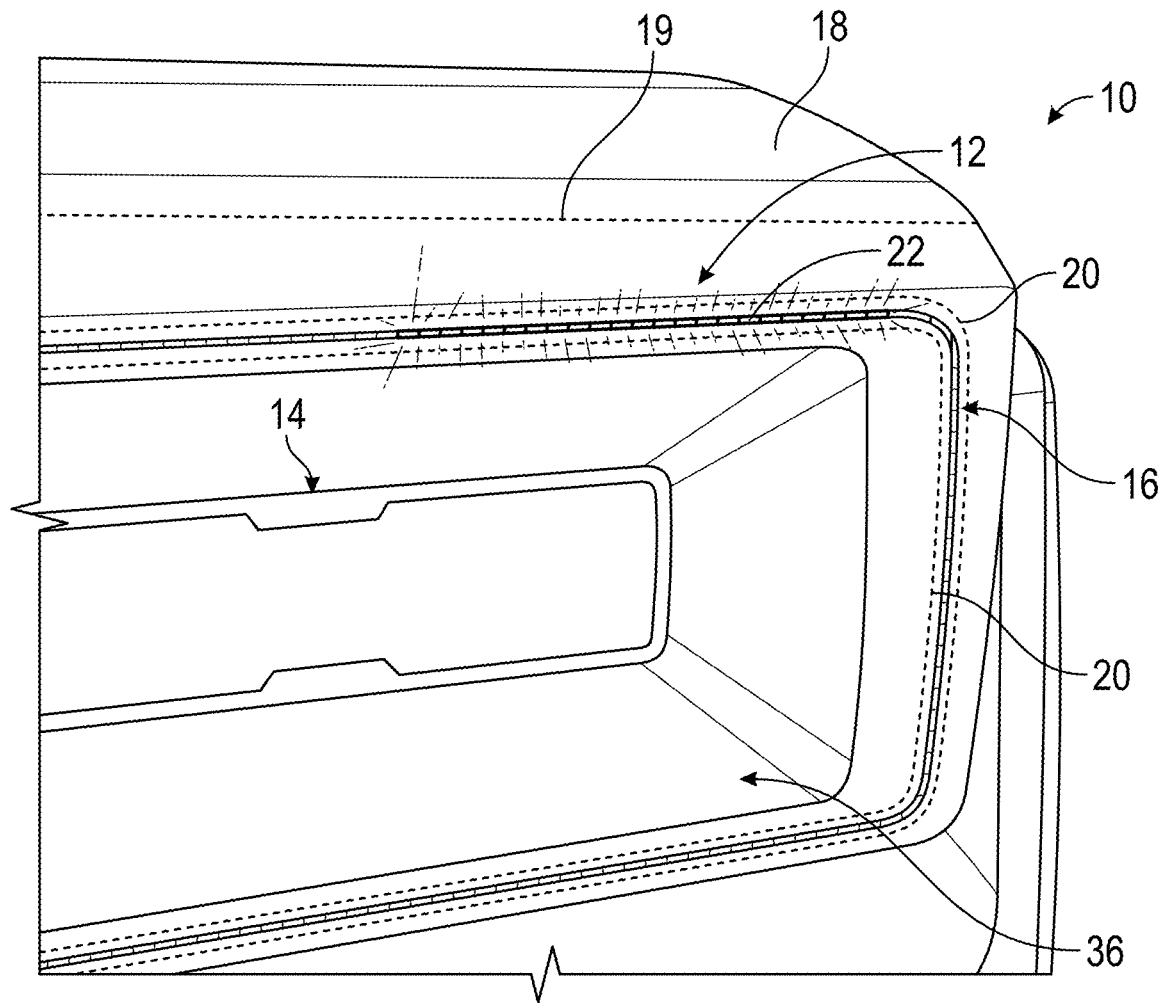
FIG. 5 is an illustration of a portion of a vehicle interior for use with illuminated stitching in accordance with the present disclosure.

FIG. 5 is an illustration of a portion of a vehicle interior 10 for use with illuminated stitching assembly 12 in accordance with the present disclosure. In particular, FIG. 5 illustrates a right end portion of an instrument panel of a vehicle interior. As illustrated, the illuminated stitching assembly 12 is located in a bezel that surrounds a component of the vehicle interior, which in one embodiment may be a heating ventilation and air condition vent 14 of the vehicle. In one non-limiting embodiment, the vent may be located in an instrument panel of a vehicle.

In the illustrated embodiment, the illuminated stitching assembly 12 is located about a seam 16. The seam 16 being located in an outer show surface or outer layer 18 of the vehicle interior. In this embodiment, the illuminated stitching assembly 12 has a pair of stitches 20 located on either side of a welt 22 located in the seam 16. For example, the welt 22 can be located in a gap of the seam 16. As used herein "welt" is intended to refer to an elongated item that is embedded into the seam, The welt comprising a material that is capable of being illuminated and may have any suitable shape for insertion or embedding into the gap. The welt may be circular, oval, or in any other configuration in cross-section. In this embodiment the material used for the pair of stitches 20 comprises a light conducting material that is capable of being illuminated via a light source such as a plurality of light emitting diodes. In addition, the welt 22 may also comprise a light conducting material that is capable of being illuminated via the aforementioned light source. As such, the welt 22 comprises a material capable of being illuminated by the light source. Still further and in one non-limiting embodiment, the stitches 20 and/or the welt 22 may comprise coloring that affects the color or illumination provided or alternatively, the stitches 20 and/or the welt 22 are clear and the light source provides the desired color. In addition and in an alternative embodiment, the illuminated stitching assembly 12 can be executed as a decorative and functional stitch absent of a seam. This is illustrated as stitch 19 in FIG. 5.

In addition, each of the pair of stitches 20 and the welt 22 are capable of being independently or simultaneously illuminated so that they are visually perceivable to an occupant of the vehicle. For example, the stitches 20 and the welt 22 are all capable of being illuminated to provide various visual indicators. In one non-limiting embodiment, only the welt 22 is illuminated. In this embodiment the assembly may be provided with or without stitches 20. Alternatively and in yet another embodiment only stitches 20 are provided and illuminated.

The outer show surface 18 if the vehicle interior can be anyone of leather, vinyl, thermoplastic polyolefin (TPO), cloth, combinations thereof etc.) that are cut from a pattern and sewn together (cut-and-sew) prior to being wrapped around a component such as a seat cushion, head rest, arm rest, console lid, instrument panel substrate, etc. or any other component wherein illuminated stitches or seams are desired.

In one non-limiting embodiment and in order to enhance the softness of the outer show surface 18, a layer of cushioning support material can be provided in the region below the outer show surface 18. It is contemplated that the cushioning support material may be of any number of different constructions although a foamed material such as cross linked polypropylene (XLPP) foam may be potentially preferred. Also a substrate panel of dimensionally stable plastic or other suitable material is preferably disposed below the cushioning support material and/or below the outer show surface 18.

In one embodiment, the cushioning support material and the substrate panel serve cooperatively to provide a support structure for the outer show surface 18.

It one embodiment, a foam forms the cushioning support material and may be blown between the outer skin layer or outer show surface 18 and the substrate panel so as to form a multi-layered composite structure. It is also contemplated that the cushioning material may be attached to the outer show surface 18 in a preliminary cladding operation so as to form a preliminary layered composite which may thereafter be applied across any substrate panel as may be utilized.

Of course and in other embodiments, the outer show surface 18 can be anyone of a single layer of material such as leather, vinyl, TPO, cloth, combinations thereof etc.) that are cut from a pattern and sewn together (cut-and-sew) prior to being wrapped around a component such as a seat cushion, head rest, arm rest, console lid, instrument panel substrate, etc. or any other component wherein illuminated stitches or seams are desired.

Figure 6:
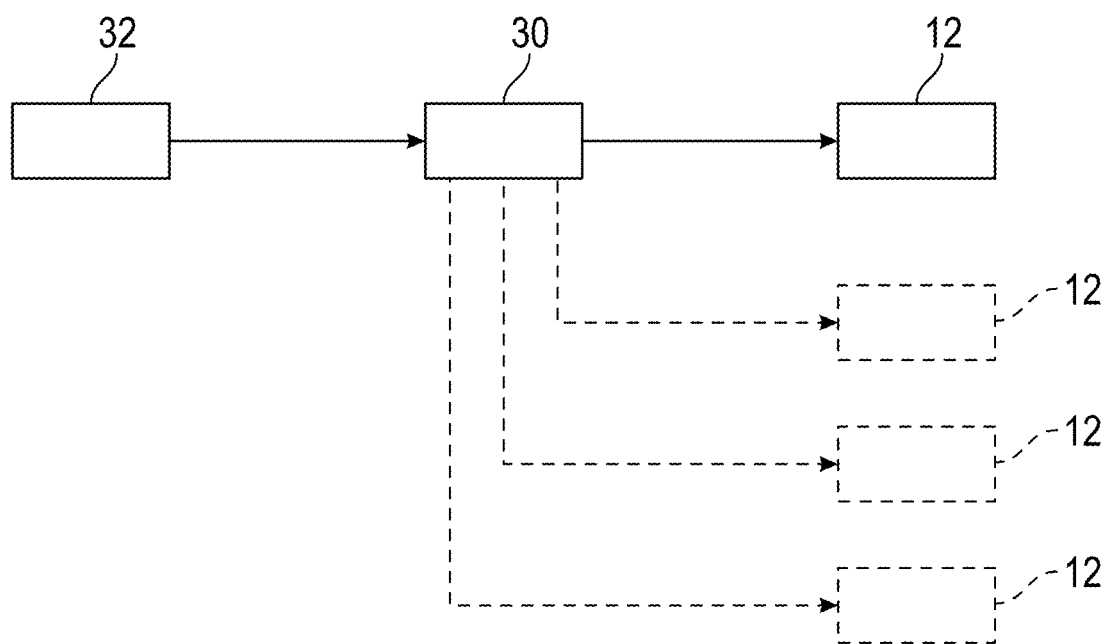
FIG. 6 is a schematic illustration of an illuminated stitching assembly in accordance with the present disclosure.

FIG. 6 is a schematic illustration of an illuminated stitching assembly 12 in accordance with the present disclosure. As illustrated, the illuminated stitching assembly 12 is operably coupled to a controller, microprocessor, microcontroller or other equivalent processing device 30 capable of executing commands of computer readable data or program for executing a control algorithm that controls the operation of the illuminated stitching assembly 12 in particular operation of the light source or light emitting diodes. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include input signal filtering to enable accurate sampling and conversion or acquisitions of such signals from communications interfaces.

For example, the controller, microprocessor, microcontroller or other equivalent processing device 30 can receive inputs from one or more sensors 32 such as, but not limited to, accelerometers, optical sensors, cameras, inputs received from vehicle components (e.g., directional switches, engine state, music volume), seat belt status, mobile phone, seat occupant sensor, etc. The sensors 32 provide input signals the controller, microprocessor, microcontroller or other equivalent processing device 30 in order to activate and/or illuminate the illuminated stitching assembly 12.

Also shown by the dashed lines in at least FIG. 6, multiple illuminated stitching assemblies 12 can be operably coupled to the controller, microprocessor, microcontroller or other equivalent processing device 30 or alternatively to additional controllers, microprocessors, microcontrollers or other equivalent processing devices 30.

Figure 7:
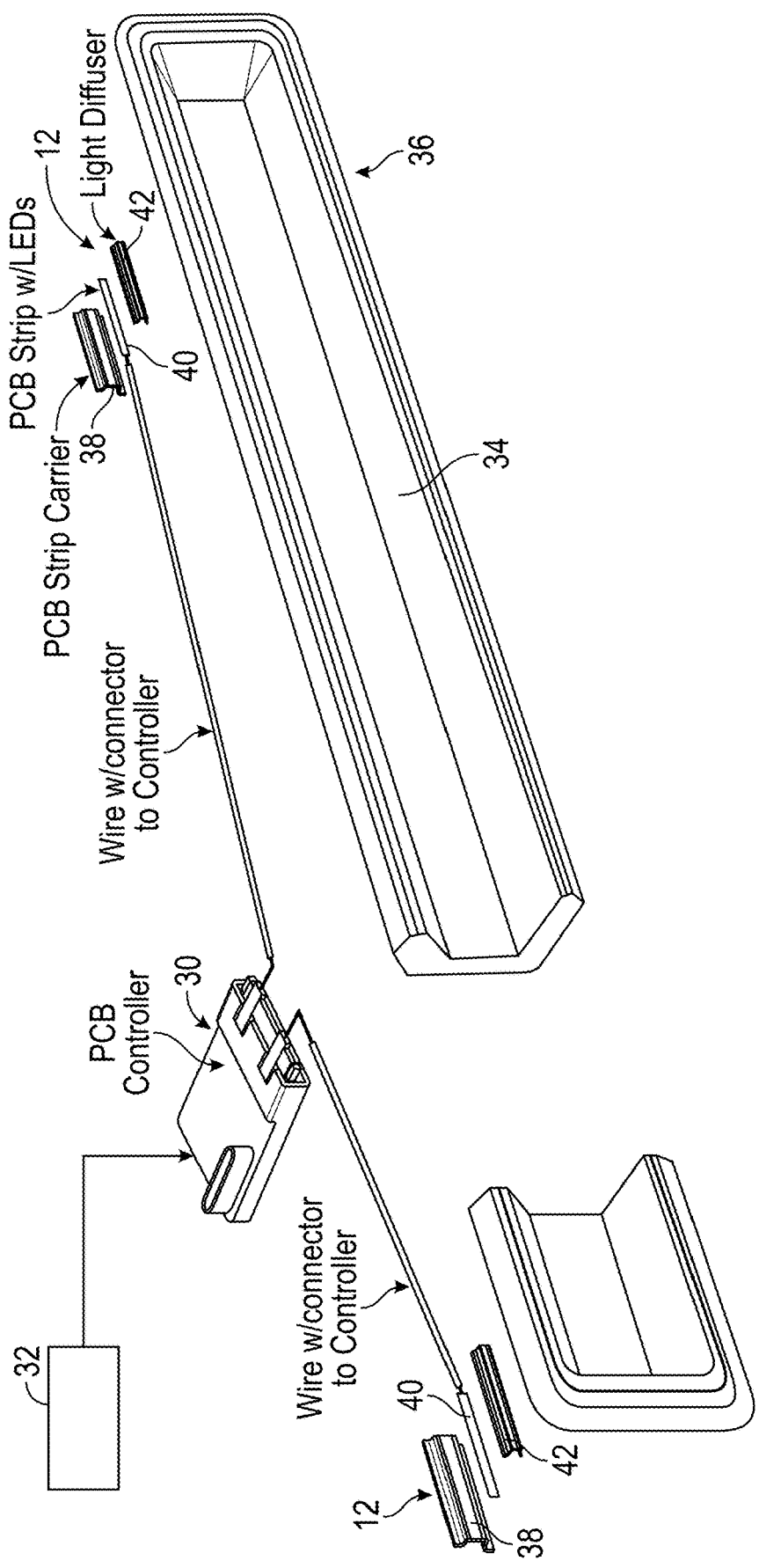
FIG. 7 is an illustration of portions of a vehicle interior with an illuminated stitching assembly in accordance with the present disclosure.

FIG. 7 illustrates a portion of a substrate 34 of a vehicle instrument panel 36. Also shown is possible locations of the illuminated stitching assemblies 12. In addition and in this illustrated embodiment, the illuminated stitching assembly 12 includes a printed circuit board carrier 38, a printed circuit board 40 that includes a light source such as a plurality of light emitting diodes or any other equivalent device and a light diffuser or light guide 42 for transmitting the light from the light source. In one non-limiting embodiment, the printed circuit board 40 may be a flexible printed circuit board 40.

Figure 8:
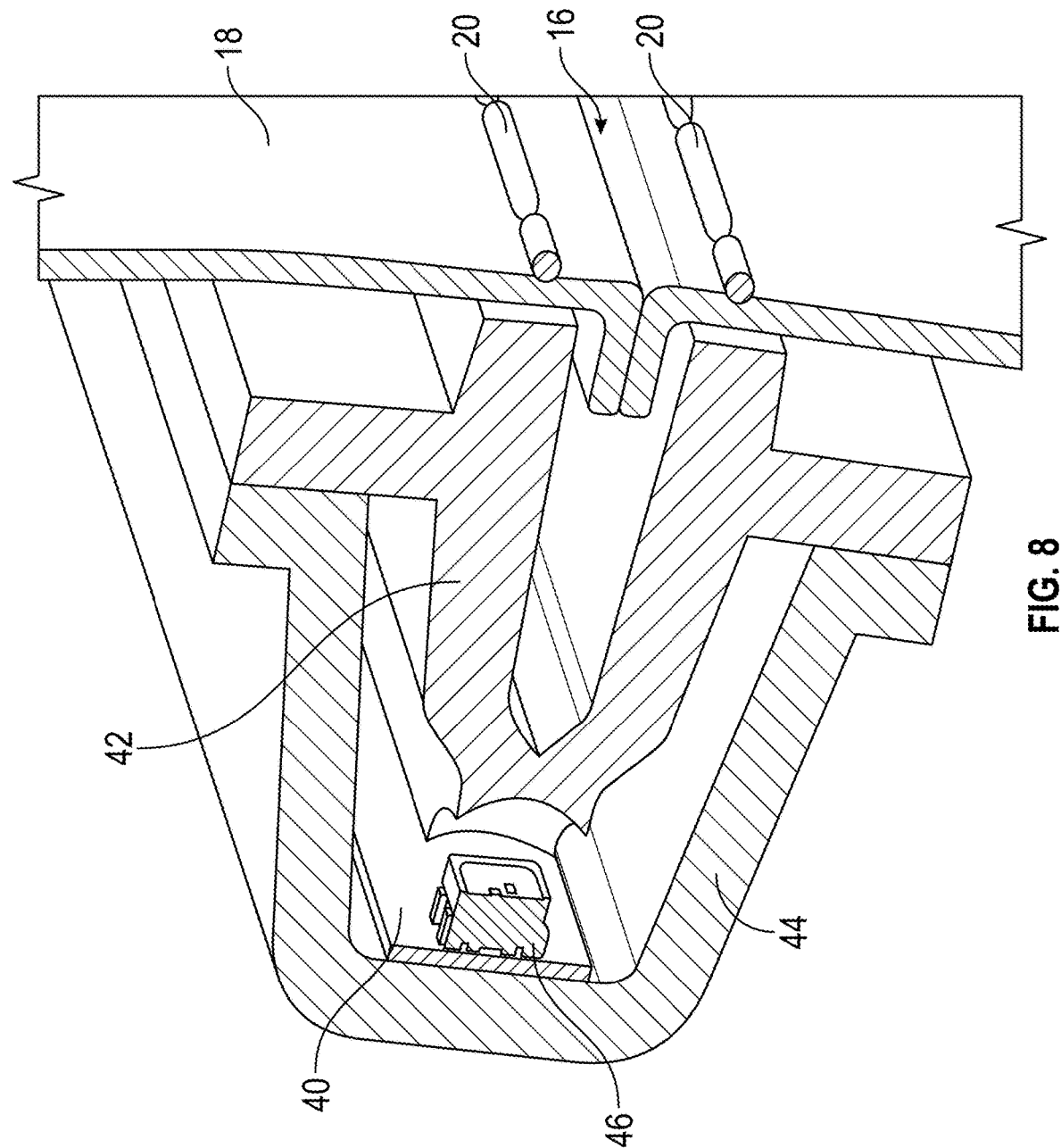
FIG. 8 is a cross-sectional view of an illuminated stitching assembly in accordance with the present disclosure.

FIG. 8 illustrates a portion of an illuminated stitching assembly 12. As illustrated and in this embodiment, the illuminated stitching assembly 12 includes a channel or substrate member 44 that is securable to the substrate 34 and positions the printed circuit board 40 with its light source or light emitting diodes 46 adjacent to the diffuser 42 such that light from the light source or light emitting diodes 46 is transferred to the stitches 20 such that they can be illuminated. FIG. 8 illustrates the illuminated stitching assembly 12 without a welt 22 however and as discussed herein the welt 22 may also be used or in some embodiments only the stitches are used and illuminated.

Figure 9:
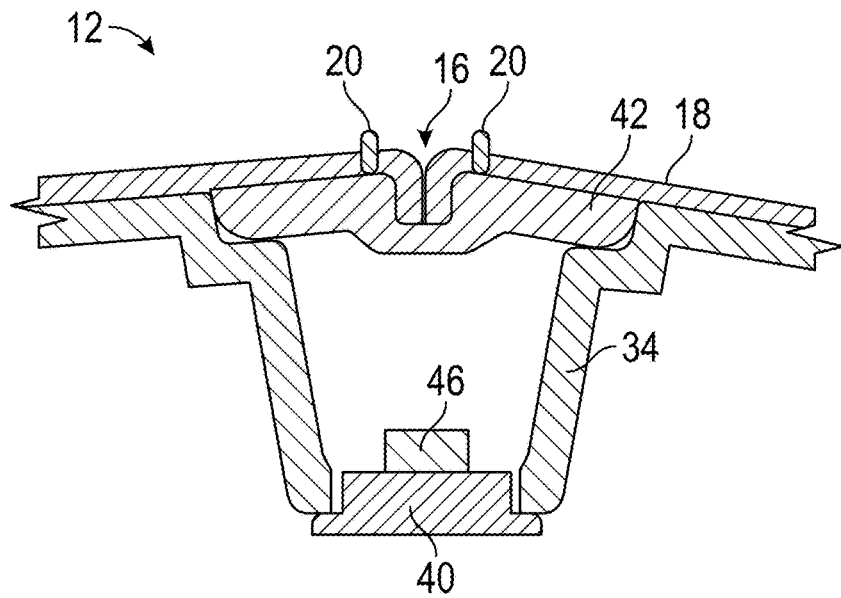
FIG. 9 is a cross-sectional view of an illuminated stitching assembly in accordance with the present disclosure.

FIG. 9 is a cross-sectional view of an illuminated stitching assembly 12 in accordance with another embodiment of the present disclosure. This embodiment is similar to the FIG. 8 embodiment however, the diffuser 42 is spaced from the light emitting diodes 46 and the substrate 34 is a backing portion of the instrument panel 36.

Figure 10:
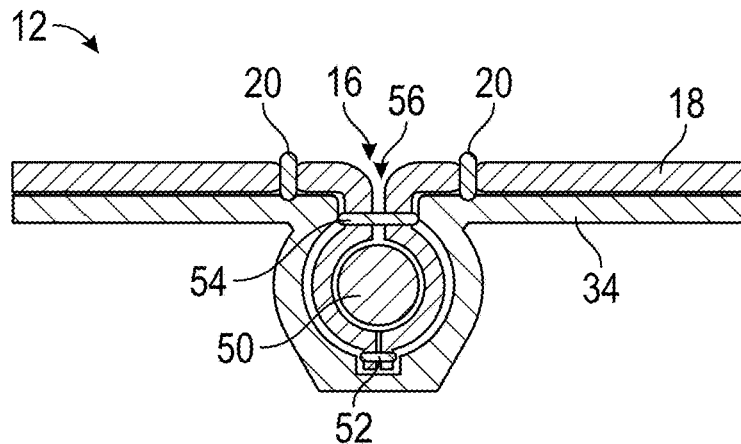
FIG. 10 is a cross-sectional view of an illuminated stitching assembly in accordance with the present disclosure.
Figure 11:
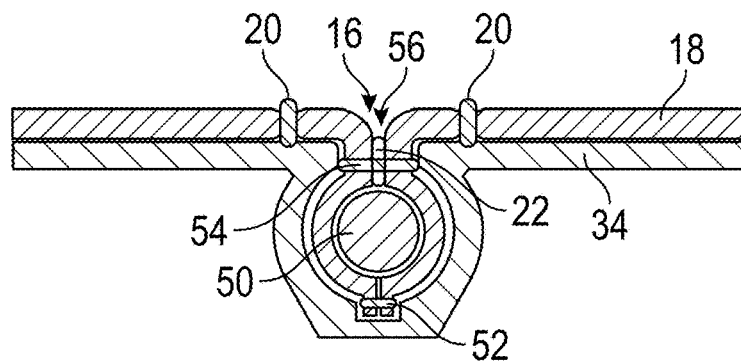
FIG. 11 is a cross-sectional view of an illuminated stitching assembly in accordance with the present disclosure.

Referring now to FIGS. 10 and 11, alternative embodiments of the illuminated stitching assembly 12 in accordance with the present disclosure are illustrated. Here the seam 16 is a French seam and a light source or fiber optic light transmitting device 50 is embedded into the seam 16.

The seam 16 includes a first join seam 52 and a second or upper join seam 54. The second or upper join seam 54 being closer to an exterior surface of the outer show surface 18. The first join seam 52 being tighter than the second join seam 54 such that a gap 56 is provided. Gap 56 allows the light from the fiber optic light transmitting device 50 to be transmitted therethrough. In this embodiment, the fiber optic light transmitting device 50 may be a side emitting fiber optic able that is operably coupled to the controller 30. In this embodiment, the stitches 20 are not illuminated by the light source or fiber optic light transmitting device 50. Alternatively and in another embodiment, the stitches 20 are also illuminated by the light source or fiber optic light transmitting device 50.

In FIG. 11 another embodiment of the illuminated stitching assembly 12 is illustrated. However, a welt 22 is located in the gap 56. Here the welt 22 is semi clear or translucent so that light of the fiber optic light transmitting device 50 is transmitted therethrough.

Figure 12:
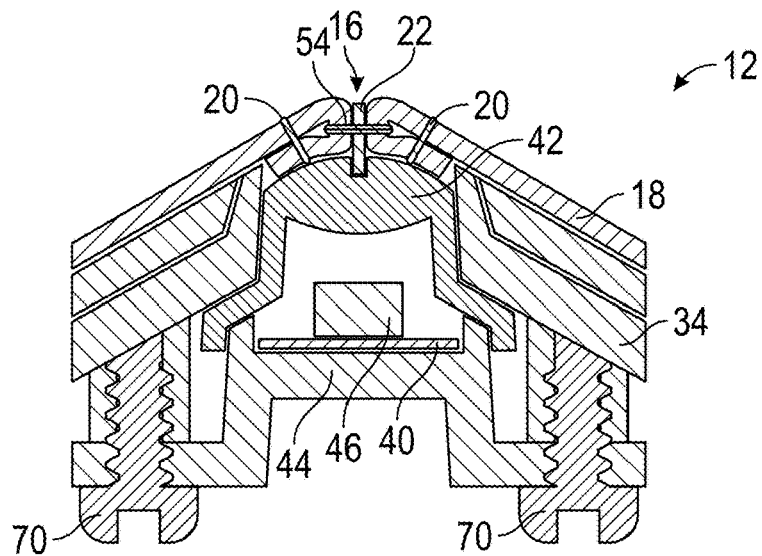
FIG. 12 is a cross-sectional view of an illuminated stitching assembly in accordance with the present disclosure.

In FIG. 12 another embodiment of the illuminated stitching assembly 12 in accordance with the present disclosure is illustrated. Here the seam 16 is a French seam and the stitches 20 and a welt 22 are illuminated by a diffuser 42 that is secured to the substrate 34 by a fastener(s) 70 such as a screw or other equivalent fastener. Here, the light source or light emitting diodes 46 and printed circuit board 40 are located on a substrate member 44, which is different and separate from substrate 34. Thus, substrate member 44 is part of the illuminated stitching assembly 12 which is separately secured to the substrate 34 by fasteners 70. This embodiment allows the instrument panel or other portion of the vehicle to have the illuminated stitching assembly 12 secured to a universal design, which allows for multiple options for a single design. For example, the design allows the instrument panel or other portion of the vehicle to either be illuminated by securing the substrate member 44 to the substrate 34 with fasteners 70 or not where the substrate member 44 is not secured to the substrate 34. This also allows for repair of the illuminated stitching assembly 12.

Figure 13:
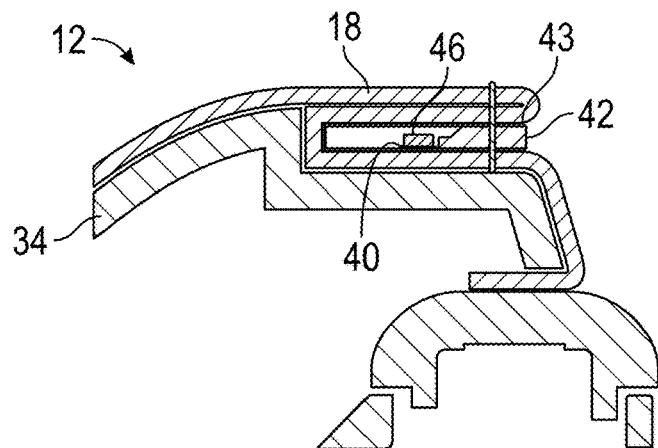
FIG. 13 is a cross-sectional view of an illuminated stitching assembly in accordance with the present disclosure.

FIG. 13 is a cross-sectional view of an illuminated stitching assembly 12 in accordance with the present disclosure. Here a deck seam is employed and the diffuser 42 is enclosed in a gap of the deck seam. Here the light source or light emitting diodes 46 provides a source of illumination to the diffuser 42. A layer of encapsulation 43 can be applied around these components. Alternatively, there may be no need for the layer of encapsulation 43.

Figure 14:
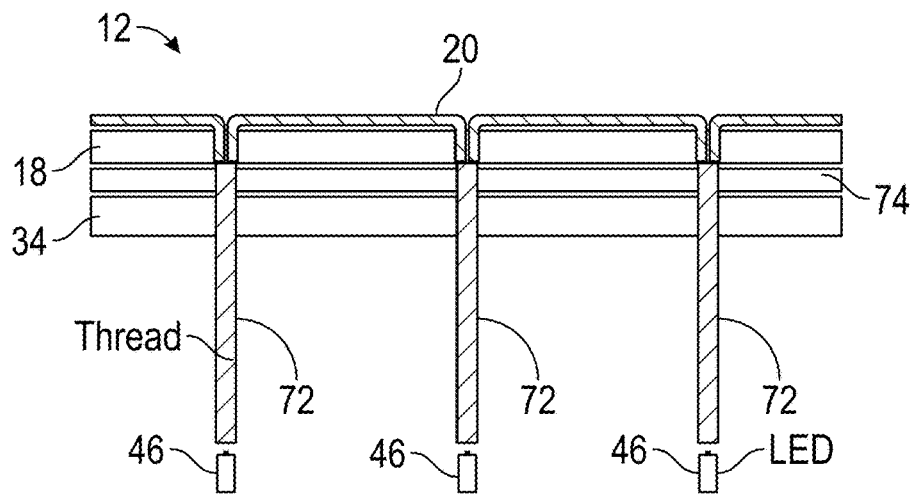
FIG. 14 is a cross-sectional view of an illuminated stitching assembly in accordance with the present disclosure.

FIG. 14 illustrates yet another embodiment of the illuminated stitching assembly 12 where the light emitting diodes 46 provide light to a thread 72 which is configured to provide light emitted from the light emitting diodes 46 to an end of a thread 20 located on the surface of outer layer 18. As mentioned above, threads 20 and 72 may be any materials capable of being illuminated or for transmitting the light form the light source. Located between outer surface layer 18 and substrate 34 is a foam layer 74.

Figure 15:
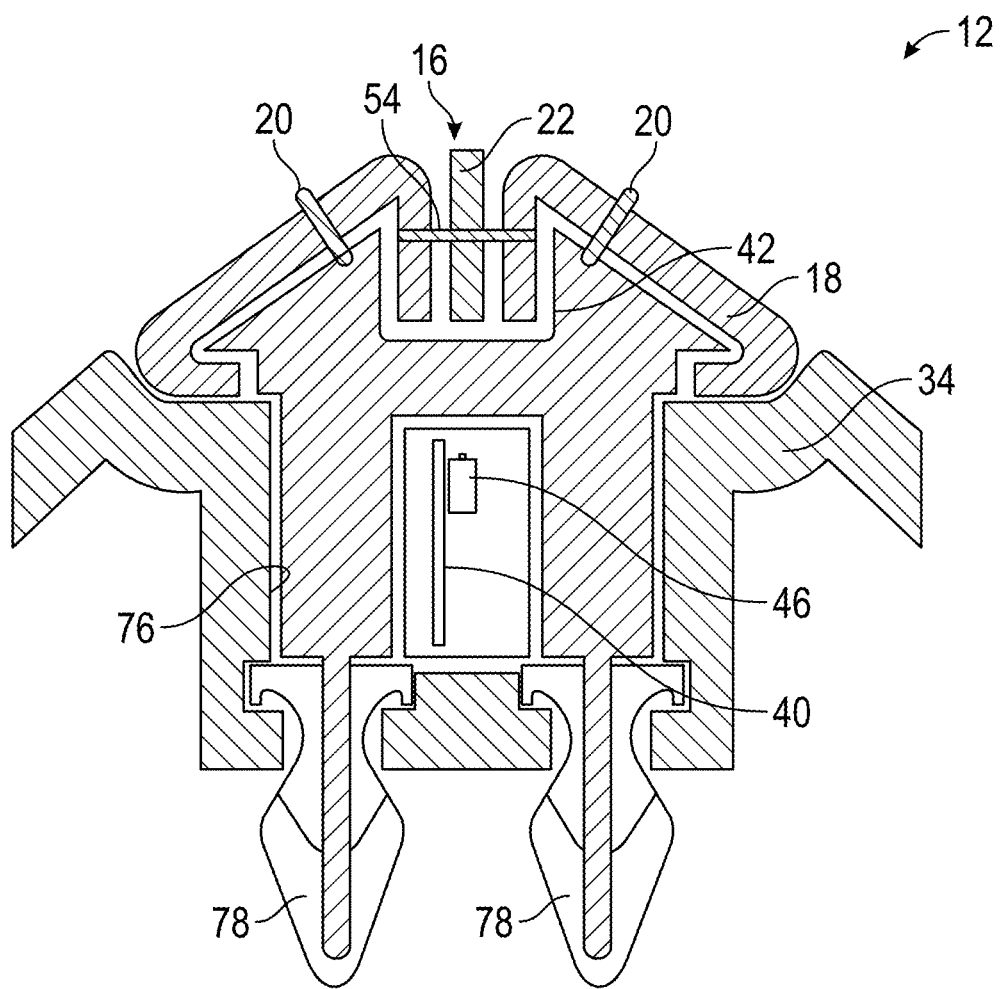
FIG. 15 is a cross-sectional view of an illuminated stitching assembly in accordance with the present disclosure.

FIG. 15 illustrates yet another embodiment of the illuminated stitching assembly 12 including the light source or light emitting diodes 46 and the diffuser 42. Here the illuminated stitching assembly 12 comprising the outer layer 18, stitches 20, welt 22, diffuser, light source 46 and printed circuit board 40 are inserted into a cavity 76 formed in the substrate 34. Here the illuminated stitching assembly includes clips or fasteners 78 that allow the illuminated stitching assembly 12 to be inserted into the front of the substrate. Here the clips or fasteners 78 provide a means for securing the illuminated stitching assembly 12 to the substrate 34. In addition and in one non-limiting embodiment, the clips or fasteners 78 may also provide a terminal for providing power to the illuminated stitching assembly 12. Alternatively, a separate terminal for providing power to the illuminated stitching assembly 12 can be provided. In this embodiment, a faux French seam is provided. Of course, other seam configurations are contemplated to be within the scope of the present disclosure.

This embodiment allows the illuminated stitching assembly 12 to be constructed as a module that can be attached onto an existing trim design. This allows for market segmentation to differentiate trim levels. For example, base mode trim would have just a French seam (standard welt) and the up-level trim would have a French seam (light transmissible) along with the light source or light emitting diodes 46 attached thereto to provide power and lighting to the light transmissible welt 22 and/or the stitches 20.

It being understood that any of the aforementioned embodiments may be used to provide the visual indicator of a status of a system of the vehicle or a status of the vehicle itself. Moreover, the illuminated stitching assembly 12 of any of the aforementioned embodiments may be located in any area of the vehicle and not those specifically described or shown in the present application.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An illuminated stitching assembly for a vehicle interior, comprising:
   a diffuser;
   a light source;
   an outer layer secured to the diffuser; and
   stitches located on the outer layer, the stitches being illuminated by the light source, the light source being operably coupled to a controller, the controller being configured to operate the light source, wherein the diffuser is configured to be inserted into a cavity of a substrate layer and the diffuser is spaced from the light source.

2. The illuminated stitching assembly as in claim 1, further comprising at least one fastener for securing the diffuser to the cavity of the substrate layer.

3. The illuminated stitching assembly as in claim 2, wherein the light source is a plurality of light emitting diodes.

4. The illuminated stitching assembly as in claim 3, wherein the substrate layer is a portion of an instrument panel.

5. The illuminated stitching assembly as in claim 1, wherein the diffuser is spaced from the light source by the substrate layer.

6. The illuminated stitching assembly as in claim 1, wherein the substrate layer is a portion of an instrument panel.

7. The illuminated stitching assembly as in claim 1, further comprising a welt located in a gap of a seam of the outer layer, wherein the welt is illuminated by the light source.

8. The illuminated stitching assembly as in claim 7, wherein the light source is a plurality of light emitting diodes.

9. An illuminated stitching assembly for a vehicle interior, comprising:
   stitches located on an outer layer, a welt located in a gap of a seam of the outer layer, the stitches and the welt being capable of being illuminated by a light source, the light source being operably coupled to a controller, the controller being operably coupled to at least one sensor;
   a diffuser located between the light source and the stitches, the outer layer being secured to the diffuser, wherein the diffuser is configured to be inserted into a cavity of a substrate layer and the diffuser is spaced from the light source.

10. The illuminated stitching assembly as in claim 9, wherein the illuminated stitching assembly provides a visual indication that is indicative of a state of that is indicative of a state of a vehicle the vehicle interior is located in or a subsystem or feature of the vehicle.

11. The illuminated stitching assembly as in claim 9, wherein the welt and the stitches are independently illuminated.

12. The illuminated stitching assembly as in claim 9, wherein only the welt is illuminated.

* * * * *